United States Patent [19]

King et al.

[11] Patent Number: 5,387,062
[45] Date of Patent: Feb. 7, 1995

[54] HAND HELD DEVICE FOR CODE CUTTING KEY BLANKS

[76] Inventors: Ricky L. King; Robert F. Robinson, both of 3528 Maryland Ct., Richmond, Va. 23233

[21] Appl. No.: 158,206
[22] Filed: Nov. 29, 1993
[51] Int. Cl.6 .......................... B23D 5/00; B26F 1/12
[52] U.S. Cl. ...................................... 409/277; 83/414; 83/917
[58] Field of Search ................. 409/277, 82, 264, 272; 83/917, 414

[56] References Cited

U.S. PATENT DOCUMENTS

| | | | |
|---|---|---|---|
| 3,496,636 | 2/1970 | Lieptz | 83/917 X |
| 3,633,451 | 1/9197 | Lieptz | 83/917 X |
| 4,468,994 | 9/1984 | Lieptz | 83/917 X |
| 4,562,759 | 1/1986 | Schmitt | 83/917 X |
| 4,717,294 | 1/1988 | Grasser | 409/81 |
| 4,998,349 | 3/1991 | Killeen | 83/414 |

Primary Examiner—William Briggs
Attorney, Agent, or Firm—Norman B. Rainer

[57] ABSTRACT

A portable hand-held device for code cutting notches in a key blank by a punching mechanism permits quick and easy modification to accommodate key blanks of different configurations and keys requiring different notch depth, notch spacing and notch angle. A key-gripping vise slidably held by a carriage moves transversely to the punch to achieve proper notch spacing. The carriage is controllably moved to different heights above the punch by detents in a circular drum, whereby the depth of the notch is determined. The punch rod and matching anvil may be replaced to achieve a different notch angle.

7 Claims, 3 Drawing Sheets

HAND HELD DEVICE FOR CODE CUTTING KEY BLANKS

BACKGROUND OF THE INVENTION

1. Field of the Invention

This invention concerns the production of keys from key blanks, and more particularly relates to a hand held apparatus for producing keys pursuant to a coded punching sequence.

2. Description of the Prior Art

It is known in the art to utilize key duplicating machines which use the original key as a pattern for duplicating the cuts of the key on a conforming key blank which is acted upon by a revolving cutter wheel to produce a pattern dictated by the original key.

It is also known in the art to provide power or manually operated machines which do not utilize an original key for purposes of patterning the cuts on a replacement key blank, but instead utilize key code books, decoded original keys, or other available information designating the depth and sequence of cuts on the original key for the purpose of making like cuts on the replacement key blank. In this type of machine, conveniently referred to as a "code cutter", depth-setting components establish a depth of cut each time that the key blank is moved to the next cutting or notching position. Small, hand-held manually operated key cutting devices find extensive use for on-site key changes at apartment buildings, office buildings, hotels and motels employing modern precision cylinder locks. Such devices also find repetitive use at automobile dealerships and onsite for replacement of lost keys.

In the hand-held machines disclosed in U.S. Pat. Nos. 3,496,636; 3,633,451; 4,468,994; 4,562,759 and 4,998,349, the key blank to be cut is secured orthogonally to a reciprocating punch. When urged forwardly, the punch makes the desired cut in the key blank. A fixed die or anvil, positioned on the opposite side of the key blank, has the same shape as the punch, and assures accuracy of the cut. Spring means restore the punch rearwardly to a starting position in readiness for the next cut. The punch, of generally elongated cylindrical contour rides in a groove in a base. A handle is associated with the rear extremity of the base. A lever, pivotally associated with the handle in pistol-like configuration acts upon the rear extremity of the punch. When the lever is squeezed in trigger-like manner toward the handle, the punch is forced forwardly to produce the cut in the key blank. The motion of the punch is always the same. The variations in the key-punching code are produced by changing the elevational and horizontal positions of the key blank in a plane orthogonal to the punch.

Various expedients have been used for changing the position of the key blank so as to produce sought variations in cut depth and spacing. Whereas precision is required in the key cutting device, it is also desirable that the key-cutting operation be rapidly achievable and that the apparatus have considerable versatility in terms of the configuration of the receivable key blank and the setting of depth and spacing codes.

A further variable in the coding of keys is the angle at which the cut is formed in the edge of the key blank. Such cut angle is dependent upon the configuration of the forward or cutting extremity of the punch, and matching die. In the key punching devices of the aforesaid patents, the punch is not readily removable from the base, and the die is not easily replaced. Accordingly, changes in the cut angle are difficult, if not impossible with the same device.

It is accordingly an object of the present invention to provide a hand-held device of improved speed and versatility of use for code cutting key blanks.

It is another object of this invention to provide a device as in the foregoing object which does not require dismantling to accommodate key blanks of different configuration.

It is a further object of the present invention to provide a device of the aforesaid nature which can be easily adjusted to accommodate keys requiring different cut spacings and depths.

It is a still further object of this invention to provide a device of the aforesaid nature permitting interchangeability of the punching member and anvil to accommodate keys requiring different cut angles.

These and other beneficial objects and advantages will be apparent from the following description.

SUMMARY OF THE INVENTION

The above and other beneficial objects and advantages are accomplished in accordance with the present invention by a portable hand-held device for cutting notches in a key blank pursuant to a code specifying the spacing, depth and angle of said notches, said device comprising a body elongated between forward and rearward extremities, a handle downwardly directed from said rearward extremity, a punch rod removably mounted for reciprocating axial movement along said body and having a key-shearing forward end constituting a punch, an anvil removably mounted at said forward extremity and having an aperture in alignment with said punch, a removable hand lever pivotally mounted on said body adjacent to said handle and adapted to urge said punch rod forwardly, spring restoring means acting upon said punch rod against the forward urging of said lever, a track beam extending orthogonally upward from said body and having means for adjusting notch depth, a carriage mounted for sliding reciprocal motion upon said track beam, removable key-gripping vise means slidably held by said carriage in a manner permitting reciprocal motion transverse to said punch rod, and means for stepwise control of said transverse motion, thereby controlling spacing of the notches.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
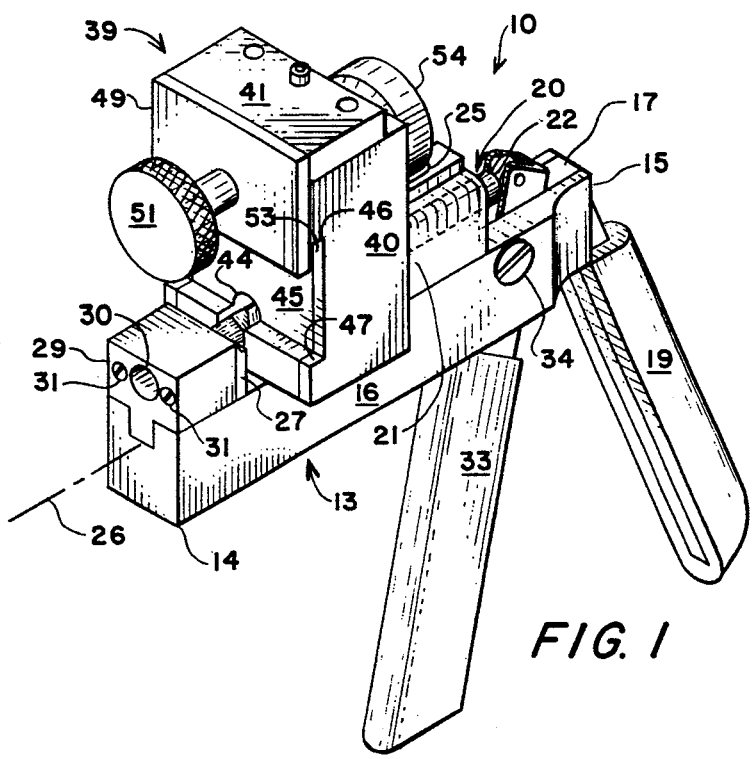
FIG. 1 is a front and top perspective view of an embodiment of the key punching device of this invention with said key-gripping vise means removed for clarity of illustration.
Figure 3:
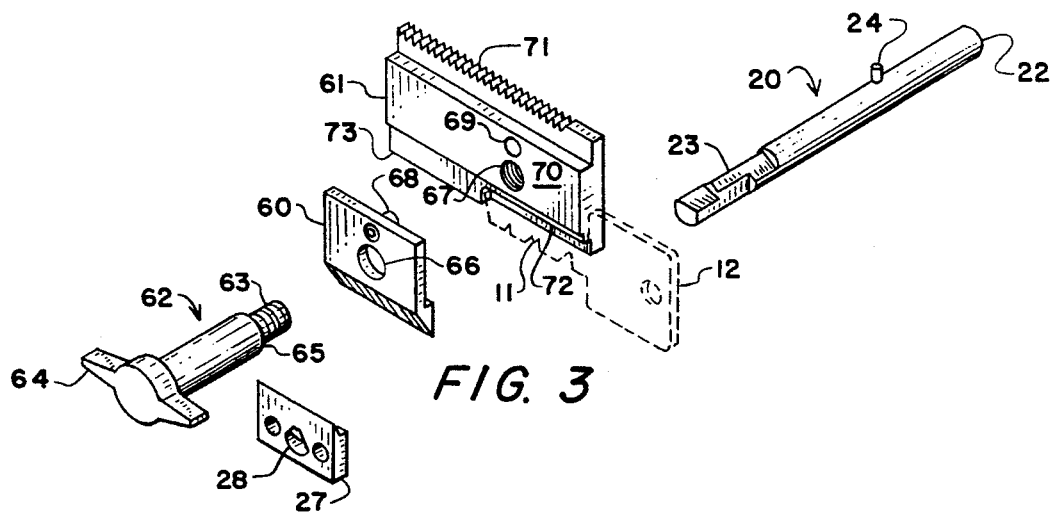
FIG. 3 is an exploded perspective view of the key-gripping vise means of FIG. 2 shown with a key blank and punch in cutting position.

Referring to FIGS. 1-8, an embodiment of the key-cutting device 10 is operable to produce by a punching technique one or more notches 11 in a key blank 12. The key-cutting device includes a body comprised of foundation beam 13 elongated upon an axis 26 between forward and rearward extremities 14 and 15, respectively, and further bounded by side surfaces 16, upper surface 17 and lower surface 18. A handle 19 is downwardly and rearwardly emergent from lower surface 18 adjacent rearward extremity 15.

A punch rod 20 is slidably held within a housing 21 which is removably secured upon upper surface 17 by first holding bolt 78. Said punch rod, adapted for reciprocating axial movement within housing 21, has a rear extremity 22 and a forward extremity milled to have an upwardly directed angled apex 23 which constitutes a key-shearing punch. Punch rod 20 is constrained to non-rotative movement by virtue of retaining pin 24 configured to slide within slot 25 positioned atop housing 21 in parallel coplanar alignment with axis 26.

An anvil 27 removably held upon upper surface 17 adjacent forward extremity 14, has an aperture 28 disposed in alignment with punch 23. Said anvil is secured in place by abutment plate 29 having debris-emergent port 30 disposed forwardly of aperture 28, and bolts 31 that treadably engage anvil 27. A second holding bolt 32, upwardly directed through beam 13, threadably secures abutment plate 29.

A removable hand lever 33, mounted by pivot bolt 34 to beam 13 adjacent handle 19, extends to an upper extremity 35 located above upper surface 17. Said upper extremity 35 holds thrust wheel 36 adapted to rotate in the plane of lever 33. Said thrust wheel contacts rear extremity 22 of punch rod 20. Accordingly, when lever 33 is squeezed toward handle 19, thrust wheel 36 forces punch rod 20 forwardly.

A track beam 37 extends orthogonally upward from upper surface 17 and is threadably secured in place by third holding bolt 38 upwardly directed through beam 13. A channel 43 in beam 37 allows penetrative passage of punch rod 20.

Carriage 39, slideably mounted upon beam 37 for reciprocal thereupon, is comprised of side panels 40 which laterally embrace beam 37, top panel 41, and forward surface 42. The lowermost portion of panel 41 contains a passage 44 aligned with channel 43 and configured to permit passage of punch 23. A transverse slot 45 is disposed in forward surface 42 and bounded by upper and lower straight shoulders 46 and 47, respectively. A positioning shaft 48 is secured by plate 49 to the upper portion of forward surface 42 and axially centered within vertical plane 50, shown in FIG. 5, that includes axis 28 of beam 13 as shown in FIG. 1. The forward extremity of shaft 48 is equipped with knurled turning knob 51, and the rearward extremity of shaft 48 has a pinion configuration having teeth 52 that protrude downwardly through the upper shoulder 46 of transverse slot 45. The lowermost extremity of plate 49 extends downwardly below upper shoulder 46, forming therewith a trough-like guide channel 53.

A circular positioning drum 54 is rotatively supported by removable bolt 55 upon track beam 37, and extends rearwardly therefrom upon an axis parallel to axis 28 within plane 50. Drum 54 is provided with a plurality of numbered peripheral detents 56 of varied depth. A ball bearing 57, disposed above drum 54 and centered within plane 50, is adapted to enter the uppermost detent 58. A calibration bolt 79, threadably held by top panel 41 of carriage 39, is positioned to abut ball bearing 57 and force it toward said uppermost detent. Paired restorative coil springs 58 are interactive between top panel 41 and track beam 37 in a manner to urge carriage 39 downwardly upon track beam 37. By said virtue of such manner of construction, rotation of drum 54 causes said carriage to be positioned at different elevations with respect to punch 23. As will be seen, this controls the depth of cut of a given notch in a key blank, said depth being selected merely by rotation of drum 54 to a numbered position.

Interchangeable key-gripping vise assembly 59 is comprised of upper vise plate 60, lower vise plate 61 and locking bolt 62 having threaded rear extremity 63, winged forward extremity 64, and bearing shoulder 65. A hole 66 in upper vise plate 60 permits passage of threaded extremity 63 which then engages threaded hole 67 in lower vise plate 61 but does not penetrate said plate 61. Such disposition causes shoulder 65 to urge both plates together to grip intervening key blank 12. A threaded spacing bolt 68 in upper vise plate 60 seats within recess 69 in the forward face 70 of lower vise plate 61. Such construction affords control over the alignment and spacing of both clamping plates.

The upper edge of lower vise plate 61 is configured to slide within guide channel 53 of transverse slot 45, and is provided with a straight rack of teeth 71 adapted to interact with pinion teeth 52. The lower edge of forward face 70 of lower vise plate 61 is provided with a key-receiving recess 72 which accurately controls the length of the key disposed within the vise assembly, and precisely disposes the lower edge of the key blank parallel to the lower straight edge 73 of vise plate 61.

Figure 4:
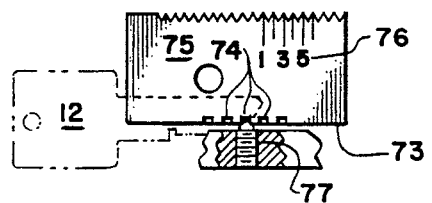
FIG. 4 is a rear view of the key-gripping vise means of FIG. 3.
Figure 2:
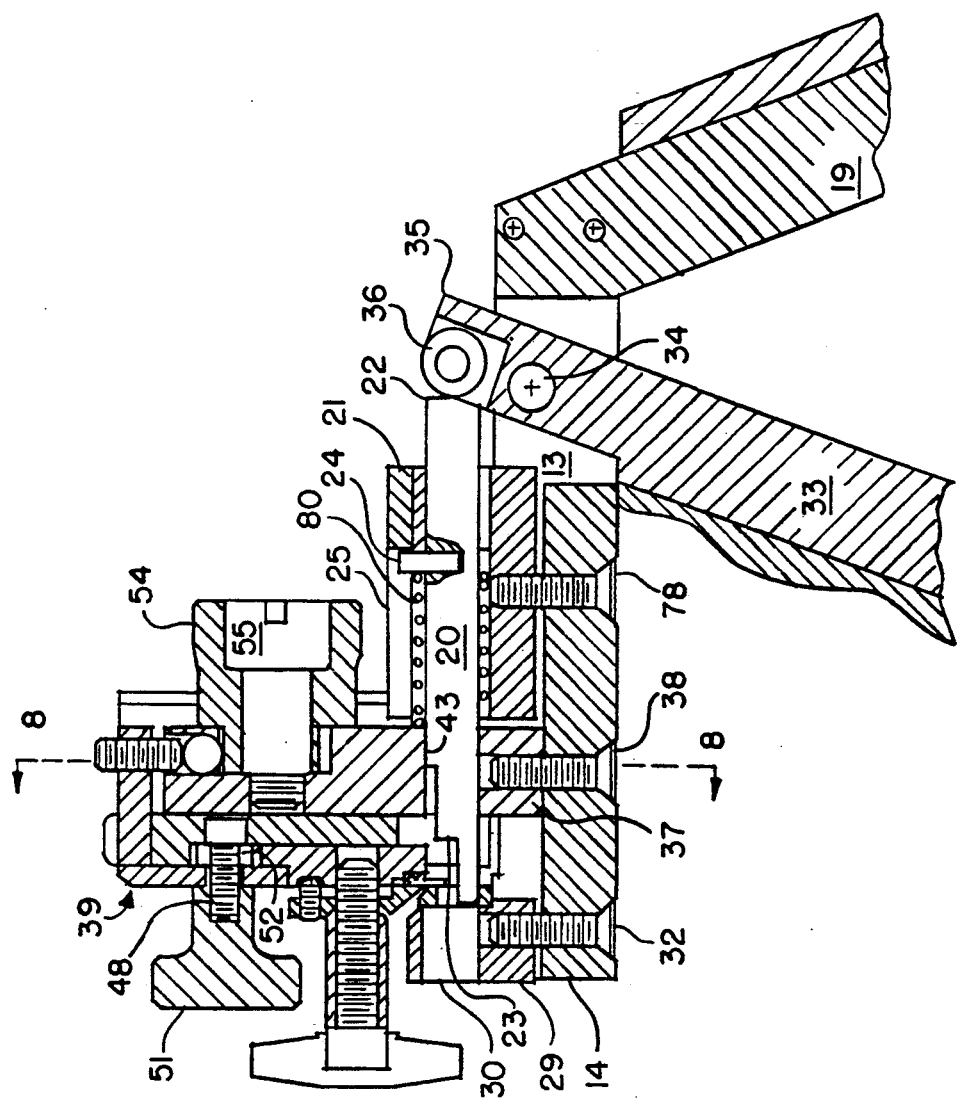
FIG. 2 is a sectional side view of the embodiment of FIG. 1, shown with emplacement of said key-gripping means.

As shown in FIG. 4, said lower straight edge 73 is provided with a series of positioning notches 74. The distance of separation of said notches corresponds to the coded spacing of the notches to be cut into the key blank. On the rear face 75 of said rearward clamping plate 61 there is disposed a series of markings 76 which correspond to the sequence number of particular notches to be cut into a key blank. By virtue of the aforesaid construction, said key-gripping vise permits the cutting of notches in both straight edges of a key blank.

Figure 5:
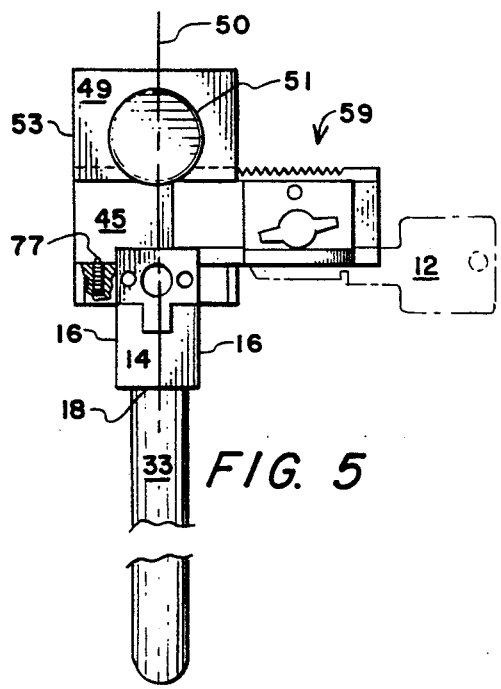
FIG. 5 is a front view of the embodiment of FIG. 1 shown with the key-gripping vise means partially inserted.
Figure 6:
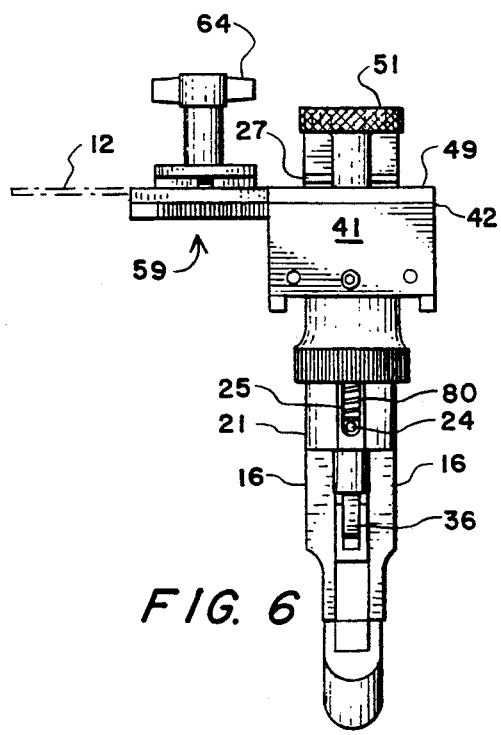
FIG. 6 is a top view of the embodiment of FIG. 5.
Figure 7:
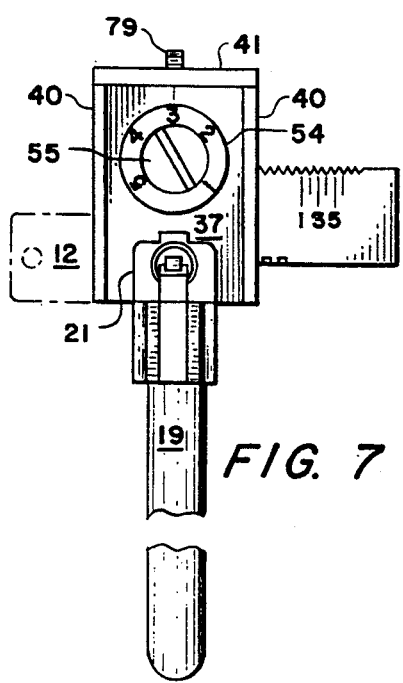
FIG. 7 is a rear view of the embodiment of FIG. 2 shown with the key-gripping vise means and key blank in operational disposition.
Figure 8:
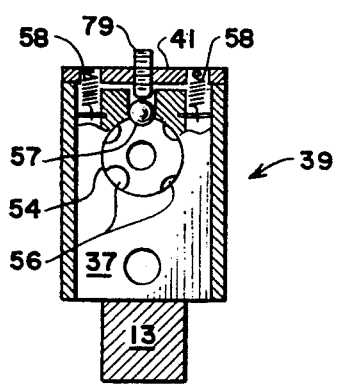
FIG. 8 is a sectional view taken in the direction of the arrows upon the line 8—8 of FIG. 2.

In the operation of the device, a vise assembly 59 having a key blank properly gripped is pushed into transverse slot 45, as shown in FIG. 5. Knob 51 is then rotated, thereby sliding assembly 59 and key blank across axis 26 until the number one position is observed from the rear upon lower vise plate 61, as shown in FIG. 7. The exact transverse position of the vise assembly is assured by spring urged ball 77 that protrudes through lower shoulder 47 into transverse groove 45. With each successive transverse position of the vise assembly, corresponding to the notch number of the key blank, the depth of the notch is selected by rotating drum 54 to a numbered position. Lever 33 is then squeezed, causing punch 23 to move forward and interact with anvil 27 to create a notch in the key blank. The cut out piece of metal from the key blank emerges from exit port 30. Upon release of squeezing force upon lever 33, punch rod 20 is urged to its rearward, starting position, by the action of coil spring 80 disposed upon said punch rod and interactive between pin 24 and track beam 37. The vise assembly 59 is sequentially advanced transversely to the carriage to perform the coded cutting or punching of notches in the key blank. The key is then removed from the clamping member and the removable vise assembly is ready to reload in preparation for cutting other keys of like code. If the next code is different, then the vise assembly is easily slid out of the transverse groove 45, and the appropriate vise is reloaded with an option of having the key preloaded (before installation into the transverse groove) or loading once the vise assembly is installed onto the transverse groove.

It is interesting to note that the aforesaid particular construction of the vise assembly and the means whereby the assembly is held during key cutting is such that the lower edge of the vise assembly can be pushed forward slightly before the key blank abuts the anvil. Such motion is achieved by virtue of a deliberate loose fitting of the upper edge of vise plate 61 within guide channel 53. This permits swinging forward motion of the lower edge of said rearward clamp. Such movement is permitted by ball 77 which maintains accurate transverse registry of the key blank despite the fact that the lower edge of the key blank is displaced forward slightly during the punching operation. Such manner of function minimize wear of the punch. Furthermore, said loose fitting of the upper edge of plate 61 within guide channel 53 causes minimal interaction of pinion teeth 52 with the teeth of rack 71. By virtue of such construction, the positioning of the vise assembly is controlled by the interaction of stopping notches 74 with ball 77.

As can be seen from the foregoing description, various vise assemblies can be utilized interactively with the device. Each vise assembly is designed to hold a given style of key blank at a controlled degree of insertion, and contains the notch spacing code 74 for that particular series of keys. Drum 54, which contains the depth of cut code, can be easily removed by removal of holding bolt 27. Punch rod 20 and matching anvil 27 can be removed and replaced with a punch rod and anvil which provide a different notch-cutting angle. Removal of punch rod 20 is achieved by first removing hand lever 33, then housing 21.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. In a portable hand-held device for cutting notches in a key blank pursuant to a code specifying the spacing, depth and angle of said notches, said device comprising a body elongated between forward and rearward extremities, and a handle downwardly directed from said rearward extremity, the improvement comprising:
   a) a removable punch rod mounted for reciprocating axial movement along said body and having a key-shearing forward end constituting a punch,
   b) a removable anvil disposed at said forward extremity and having an aperture in alignment with said punch,
   c) a removable hand lever pivotably mounted on said body adjacent said handle and adapted to urge said punch rod forwardly,
   d) a track beam extending orthogonally upward from said body and having means for adjusting notch depth in the form of a circular drum having a plurality of peripheral detents of varied depth, and a ball bearing disposed above said drum in a manner to enter the uppermost detent, said ball bearing being spring urged toward said drum such that the elevation of said carriage upon said track beam is dependent upon the depth of the detent occupied by, the ball bearing,
   e) a carriage mounted for sliding reciprocal motion upon said track beam,
   f) a removable key-gripping vise slidably held by said carriage in a manner permitting reciprocal motion transverse to said punch rod, and
   g) means interactive between said key-gripping vise and said carriage for stepwise control of said transverse motion, thereby controlling spacing of the notches.

2. In a portable hand-held device for cutting notches in a key blank pursuant to a code specifying the spacing, depth and angle of said notches, said device comprising a body elongated between forward and rearward extremities, and a handle downwardly directed from said rearward extremity, the improvement comprising:
   a) a removable punch rod mounted for reciprocating axial movement along said body and having a key-shearing forward end constituting a punch,
   b) a removable anvil disposed at said forward extremity and having an aperture in alignment with said punch,
   c) a removable hand lever pivotably mounted on said body adjacent said handle and adapted to urge said punch rod forwardly,
   d) a track beam extending orthogonally upward from said body and having means for adjusting notch depth,
   e) a carriage mounted for sliding reciprocal motion upon said track beam and having a transverse slot equipped with upper and lower straight shoulders,
   f) a removable key-gripping vise slidably held by said transverse slot in a manner permitting reciprocal motion transverse to said punch rod, said vise comprised of upper and lower plates and a threaded bolt that urges said plates together upon an intervening key blank, said lower plate having a series of positioning notches that represent the notch-spacing code for a given key blank, and
   g) means interactive between said key-gripping vise and said carriage for stepwise control of said transverse motion, thereby controlling spacing of the notches.

3. In a portable hand-held device for cutting notches in a key blank pursuant to a code specifying the spacing, depth and angle of said notches, said device comprising a body elongated between forward and rearward extremities, and a handle downwardly directed from said rearward extremity, the improvement comprising:

a) a removable punch rod mounted for reciprocating axial movement along said body and having a key-shearing forward end constituting a punch, b) a removable anvil disposed at said forward extremity and having an aperture in alignment with said punch, c) a removable hand lever pivotably mounted on said body adjacent said handle and adapted to urge said punch rod forwardly by means of a thrust wheel in contact with the rear extremity of said punch rod, d) a track beam extending orthogonally upward from said body and having means for adjusting notch depth, e) a carriage mounted for sliding reciprocal motion upon said track beam, f) a removable key-gripping vise slidably held by said carriage in a manner permitting reciprocal motion transverse to said punch rod, and g) means interactive between said key-gripping vise and said carriage for stepwise control of said transverse motion, thereby controlling spacing of the notches.

4. The improvement of claim 2 wherein said lower plate has a straight rack of teeth.

5. The improvement of claim 4 wherein a pinion gear is positioned downwardly through said upper shoulder to loosely engage said rack of teeth in a manner to controllably advance said key gripping vise transversely to said punch rod.

6. The improvement of claim 1 in the form of a kit comprised of all the features of claim 2 plus at least one extra key-gripping vise, punch rod, anvil, and circular drum for adjusting notch depth.

7. The improvement of claim 4 wherein the nature of said loose fit is such as to enable a key blank, held by said key-gripping vise, to move forwardly into contact with the anvil when contacted by said punch.

* * * * *